April 12, 1960

D. F. LEHMAN 2,932,744

SHUTTER SYSTEM

Filed Oct. 23, 1958

INVENTOR
Don F. Lehman

April 12, 1960

D. F. LEHMAN 2,932,744

SHUTTER SYSTEM

Filed Oct. 23, 1958

INVENTOR
Don F. Lehman
By Anthony D. Cennamo

April 12, 1960　　　D. F. LEHMAN　　　2,932,744
SHUTTER SYSTEM

Filed Oct. 23, 1958　　　　　　　　　　3 Sheets-Sheet 3

INVENTOR
Don F. Lehman
By Anthony V. Cennamo

United States Patent Office 2,932,744
Patented Apr. 12, 1960

2,932,744
SHUTTER SYSTEM

Don F. Lehman, Columbus, Ohio, assignor to Industrial Nucleonics Corporation, a corporation of Ohio Application October 23, 1958, Serial No. 769,204

9 Claims. (Cl. 250—105)

This invention relates to protective apparatus for use in conjunction with a source of penetrative radiation, and more particularly, to a reliable shutter system for periodically shielding radiant energy employed in a nuclear radiation gauge for measuring the physical properties of various materials.

Inasmuch as the radiant energy produced by a radioactive substance is ceaselessly generated by nuclear disintegration processes which are inexorable, it is obvious that these radiation emissions can never be completely eliminated but only suppressed.

In many radiation devices the source is usually enclosed by an adequate thickness of shielding material except for an aperture on one side through which the useful beam of radiation may emerge. When the device is not in actual use, the aperture is covered with an additional absorber member adapted to block the radiation exit so that complete shielding of the source is afforded.

To accomplish the last purpose described, various radiation shutters have been proposed. It has been customary to provide a generally rectangular shutter which is moved between the source and the radiation aperture. A pair of shutter guides are positioned at opposite sides of the aperture and contain grooves for accommodating the shutter plate. The shutter is driven through a gearing arrangement by an air cylinder. Although bearing surfaces were provided on the shutter guides, binding of the shutter therein was quite prevalent. Considerable time and labor were required to free the jammed shutter. In order to propel opposite sides of the shutter an equal amount it was necessary to convert the linear motion of the air cylinder drive piston to radial motion and thence to rectilinear motion. Rack-and-pinion mechanisms which had to be mechanically synchronized for satisfactory performance were oftentimes used for this purpose. The expense involved in producing and servicing such a shutter system is considered prohibitive.

To overcome the disadvantages of the aforementioned prior art, the present invention provides a shutter operated directly by an air cylinder. The shutter per se carries a plurality of rotatably mounted bearings in communication with a base member and shutter guides thereby providing for the rectilinear movement of said shutter along the base member between a shutter open and a shutter closed position.

For purposes of apt illustration, the present invention will be described in conjunction with a nuclear gauge for measuring the physical properties of materials. Specifically, the invention will be shown as incorporated in a nuclear instrument of the type in which reflected "backscattered" radiation is utilized for measuring the coating thickness of rolling sheet stock such as strip steel.

The reason for this choice is that reflection gauging imposes certain particular requisites on the mechanical design of a shutter mechanism which are not attendant on all types of allied devices, and the advantages of the present invention are made more apparent by illustrating the manner in which the invention fulfills these special requisites.

Accordingly, it is a primary object of the present invention to provide a shutter mechanism having greater reliability of operation than similar devices used heretofore.

It is another object of the present invention to provide a shutter mechanism that requires a minimum of mechanical components for efficient operation.

It is a further object of the present invention to provide a shutter mechanism capable of moving a thick and heavy shutter while occupying a minimum of space.

It is also another object of the present invention to provide a shutter mechanism more fluent in operation than comparable prior art devices.

It is an additional object of the present invention to provide a shutter mechanism that is inexpensive to manufacture and economical to maintain.

Still another object of the present invention is to provide an improved means to instantly return the shutter to a closed position in the event of power failure or other abnormal condition, for purposes of source protection.

Numerous other objects and features of the present invention will become apparent upon reference to the following description taken in conjunction with the accompanying drawings, in which.

Figure 1:
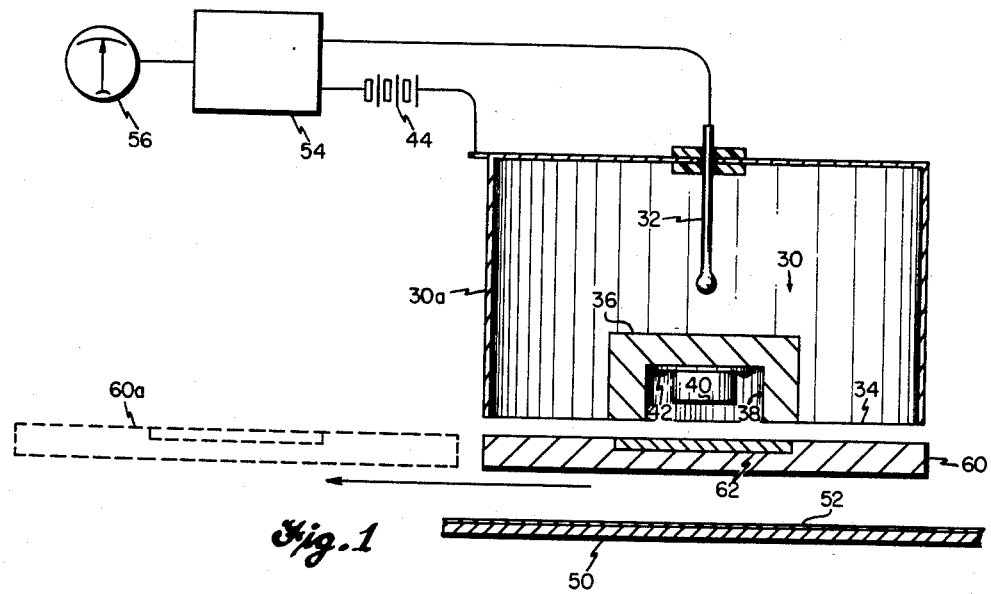
Fig. 1 is a schematic diagram partly in section illustrating the principles of radiation reflection measurement and showing certain details of the present invention associated therewith.

With reference to the drawings and specifically to Fig. 1, there is shown apparatus for gauging the thickness of material constructed in accordance with the basic principles of reflection measurement. Generally indicated at 30 is an ionization chamber for detecting nuclear radiation comprising a cylindrical metallic outer shell 30a and a probe 32 insulated therefrom. The chamber 30 is enclosed at one end by a thin window 34 sealed to the shell 30a and adapted to carry a radiation source holder 36 substantially in the center thereof. The source holder 36 may be preferably constructed of a dense radiation shielding material. A recessed portion 38 is bored in the source holder 36 for accommodating a source capsule 40 which may be secured by screws as at 42 to the holder 36. A unidirectional voltage is furnished by a battery 44 so that a potential exists between the electrodes of the chamber 30.

The chamber 30 is usually positioned at a predetermined distance from a sheet of material 50 such as strip steel having a plating of tin indicated at 52. It is highly desirable to determine the thickness of tin plate in order to effectively control the same at a desired value. To this end, radiation emanating from the source capsule 40 is directed toward the sheet stock 50. A certain portion of the incident radiation is reflected by the tin coating 52 so that radiant energy is returned to the chamber through the window 34. Gas contained in the chamber 30 is ionized by this reflected radiation thereby producing a current flow from the shell 30a to the probe 32. The magnitude of chamber current is proportional to the intensity of "backscattered" radiation. Electronic apparatus indicated at 54 serves to amplify and measure the chamber currents. Suitable indicating means 56 may also be provided with a scale calibrated to read units of tin coating thickness. It may be desirable to replace the indicator 56 with an automatic controller for maintaining the tin coating thickness at a substantially constant value.

At times it is desirable to render the radiation device inoperative by eliminating incident radiation from the sheet 50. During these periods a movable shutter 60 may be interposed between the sheet 50 and the chamber 30. The dotted line 60a indicates the retracted position of the shutter 60 which is resumed when the radiation device is being used for thickness measurement purposes. When the radiation gauge is removed from a measuring condition to standby operation, radiation is absorbed by the shutter 60 which covers the radiation exit aperture of the source holder 36. In some cases, the shutter 60 may contain an insert 62 of a particularly efficient shielding material such as is manufactured by P. R. Mallory and Co., Inc., of Indianapolis, Indiana, and marketed under the name of Mallory 1000 Metal. By this method, adequate shielding may be obtained while the thickness, weight and cost of producing the shutter are reduced to a minimum.

The ionization chamber 30, the shutter 60 and associated shutter actuating means are quite often commonly mounted within a source-detector housing. Compactness of assembly is a prime requisite inasmuch as the source-detector unit is quite often installed on industrial production lines where mounting space is at a premium. Hence the requirement for a reliable, compact shutter system must be satisfied. A preferred embodiment of the present invention adequately fulfills these requirements and an apt illustration thereof is depicted in Fig. 2.

Figure 2:
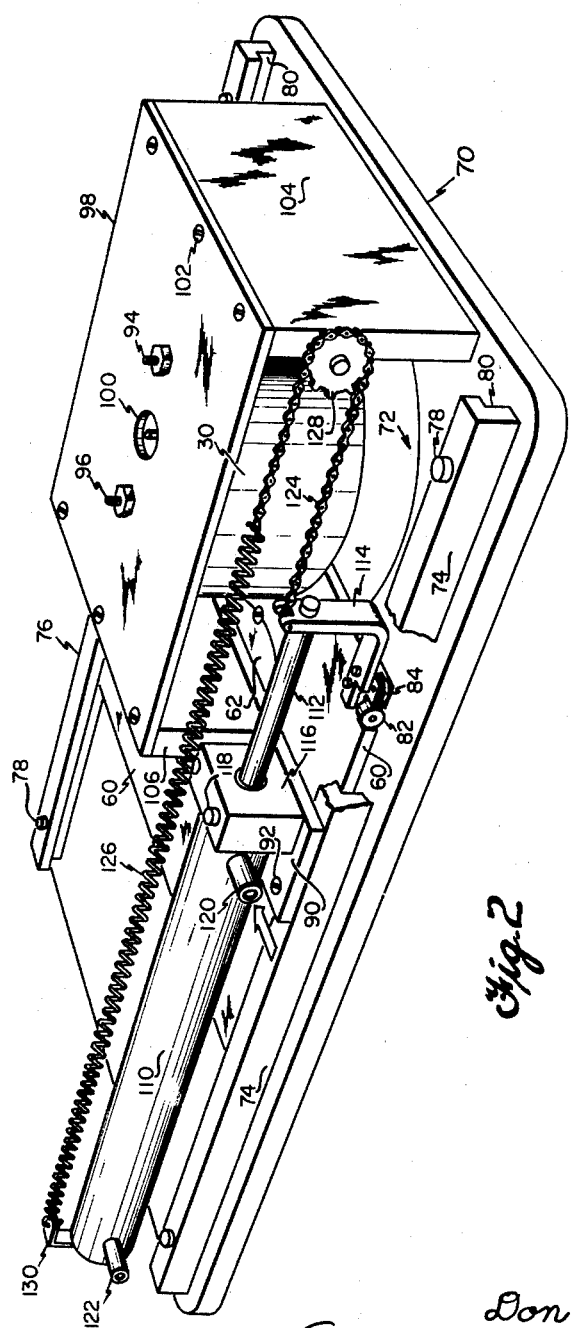
Fig. 2 is a perspective view of a shutter mechanism constructed in accordance with the present invention.

In Fig. 2, a generally rectangular base plate 70 of a typical source-detector housing contains a circular radiation aperture 72. Extending about either side of the aperture 72 for essentially the length of the base plate 70 are a pair of shutter guide bars 74 and 76. Capscrews as at 78 may serve to secure the guide bars 74 and 76 to the base 70. A milled stepped portion 80 is provided on the inside of each guide bar to conduct the shutter 60 which is movably mounted therebetween.

An essentially rectangular shutter 60 is supported by a plurality of bearings 82 rotatably mounted at each corner. The support bearings 82 are preferably fabricated of a diameter slightly greater than the thickness dimension of the shutter 60 so as to position the shutter above the base plate 70. Accordingly, the peripheral surface of the support bearing 82 is adapted to engage the undersurface of the stepped portion 80. This arrangement allows for longitudinal rolling movement of the shutter so as to cover or uncover the radiation aperture 72.

Lateral motion of the shutter 60 is restricted by another set of bearings 84 one of which is rotatably secured to each corner of the shutter 60. The axis of rotation of the bearing 84 is arranged perpendicular to the direction of travel of the shutter 60 so that the bearing protrudes slightly from the edge thereof to engage the lateral surface of the stepped portion 80. Since the shutter 60 bears against the guide bars 74 and 76 at only four points, binding problems are eliminated.

Proceeding with a description of the preferred embodiment, a platform 90 is placed across the top of the shutter guides 74 and 76 and fastened thereto by screws as at 92. The ionization chamber 30 is provided with a pair of upstanding threaded studs 94 and 96 which pass through and are secured to suitable insulators in an overhanging plate 98. An aperture 100 may be provided in the plate 98 between the mounting studs permitting access for electrically connecting conductors to the probe of the chamber 30. The plate 98 may in turn be bolted by screws at 102 to end blocks 104 and 106 so as to position the window of the chamber 30 in registry with the radiation aperture 72. End blocks 104 and 106 are arranged at diametrically opposite sides of the radiation aperture 72 and are rigidly fastened to the base 70 and the platform 90 respectively. It is appreciated that the platform 90 must be suspended above the base 70 to provide ample clearance between the chamber 30 and the base 70 for passage of the shutter 60.

Linear motion may be imparted to the shutter 60 by a fluid operated piston and cylinder driving device 110 having a piston rod 112 coupled to an angle bracket 114 which is in turn bolted to one corner of the shutter 60. A cylinder mounting block 116 is fastened by capscrews 118 to the platform 90 so that the longitudinal axis of the cylinder 110 bears a parallel relationship to the direction of travel of the shutter 60. A conduit 120 comprises a fluid inlet for admitting compressed air or other fluid into the cylinder 110. Fluid inflow is represented by the arrow. Venting of the cylinder is accomplished through the conduit 122. In a conventional manner, the length of piston rod travel is determined by piston stops built into the cylinder 110. A section of rollerless chain 124 is connected to the angle bracket 114 and trained over a rotatable sprocket 128 affixed to the end block 104. The chain 124 terminates in a spring 126 which is hooked onto an upstanding bracket 130 secured to the closed end of the drive cylinder 110.

In the operation of the hereinabove disclosed shutter system, if it is initially assumed that the shutter 60 is statically disposed in a closed position, the radiation aperture 72 will be covered by the shutter and the spring 126 will exert a unidirectional force tending to maintain the shutter in closed condition. Upon admittance of compressed air through the inlet 120, the piston is forced to the rear of the cylinder thereby causing the piston rod 112 to retract. The shutter 60 is thus moved rearward when the cylinder driving force overcomes the tension exerted by the spring 126. To close the shutter, pressure is removed from the inlet 120 thereby releasing the piston rod 112 which is withdrawn by the spring 126 through the agency of the chain 124.

Figure 3:
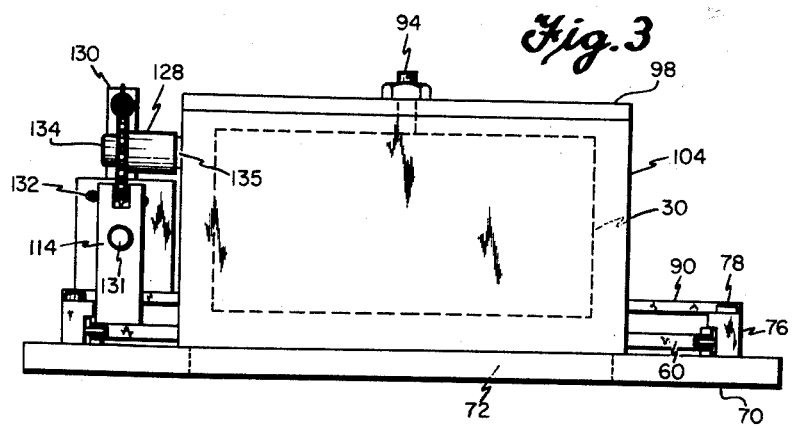
Fig. 3 is a front elevation of the apparatus of Fig. 2.

Certain details of construction not readily evident in Fig. 2 are illustrated in Fig. 3. In Fig. 3, a bolt 131 may be inserted through a tapped opening in the angle bracket 114 to engage the end of the piston rod 112. The angle bracket 114 is equipped with a notch cut in one end through which is passed the end of the chain 124. A small hole may be drilled in the angle bracket 114 for accommodating a cotter pin 132 adapted to secure the end of the chain 124 to said bracket. A shoulder screw 134 is fastened to the end block 104 to carry the chain sprocket 128. The sprocket 128 may be preferably spaced from the end block 104 by a washer 135 to maintain horizontal alignment of the sprocket with the notch cut in the angle bracket 114.

Figure 5:
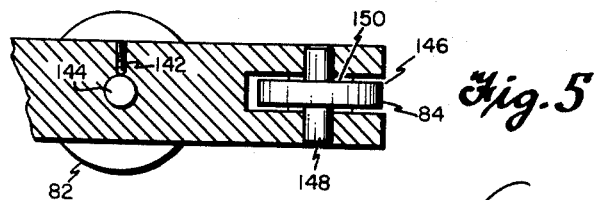
Fig. 5 is a partial sectional view taken on the jogging line 5—5 of Fig. 4.
Figure 4:
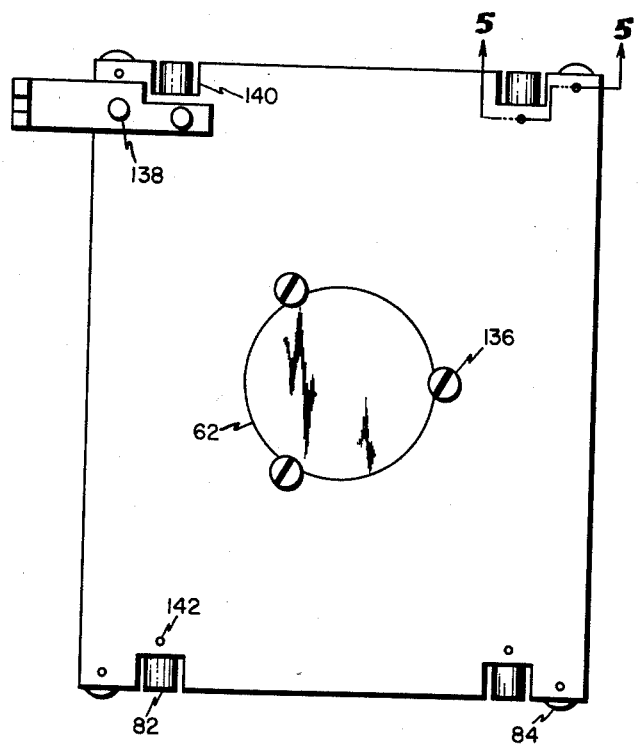
Fig. 4 is a top plan view of the shutter plate of Fig. 2 showing the support and guide bearing means therefor.

Essential constructional details of the shutter 60 may be observed in Fig. 4 and Fig. 5. Referring first to Fig. 4, the shielding insert 62 is situated substantially in the center of the shutter 60 and fastened by screws as at 136. Capscrews 138 are adapted to rigidly affix the angle bracket 114 to the shutter in such a way as to insure proper alignment of the bracket with the piston rod 112. At each corner of the shutter 60 there is provided a niche 140 in which is mounted the support bearing 82 fastened by a set screw 142. It may be observed that a portion of the guide bearing 84 extends beyond the edge of the shutter 60 so that the lateral frictional engagement of the shutter with the guide bar is reduced to a small total area. This novel arrangement virtually eliminates binding problems associated with prior shutter devices.

In Fig. 5, the support bearing 82 may comprise a cam follower rotatably mounted upon an axle 144 which is arranged parallel to the plane of the shutter 60 and perpendicular to the direction of shutter travel. A slot 146 may be cut parallel to the face of the shutter 60 to accommodate the guide bearing 84. A dowel pin 148 adapted to carry the guide bearing 84, may be press-fitted in a hole drilled perpendicular to the surfaces of the shutter 60. In addition bearing spacers 150 may be provided between the guide bearing 84 and the slot 146.

Figure 6:
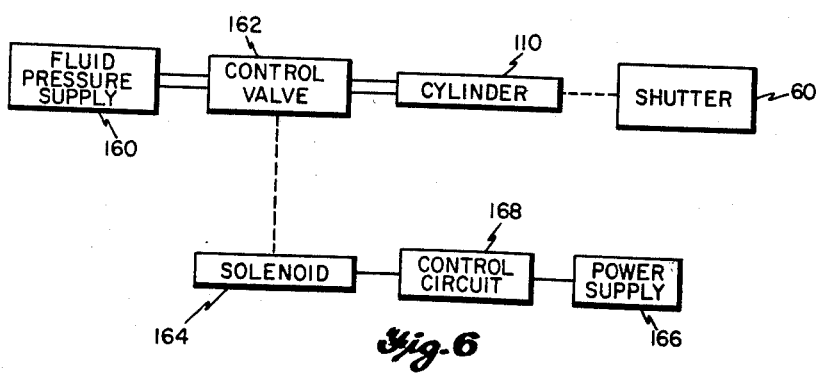
Fig. 6 is a diagrammatic view in block form illustrating a typical control system for actuating the shutter mechanism shown in Fig. 2.

With reference now to Fig. 6, the shutter 60 is actuated by the drive cylinder 110 which may receive power from a suitable fluid pressure supply indicated at 160 through a valve mechanism 162. The control valve 162 is in turn actuated by an electrical solenoid 164. Electrical power from a source 166 is applied to the solenoid 164 via a control unit 168. Control unit 168 determines the open or closed position of the shutter 60 and may be made responsive to suitable push buttons and holding relay circuits. Alternately the control circuit 168 may be rendered responsive to a thickness measurement system whereby the shutter is held open during measurement and closed during standby conditions.

Power applied to the solenoid 164 opens the valve 162 to admit fluid pressure to the cylinder 110, thereby opening the shutter. Alternatively, when power is removed from the solenoid 164, the valve 162 closes and the shutter 60 is returned to a fully closed position by the spring 126 and chain 124.

Although the present invention has been described in accordance with a specific preferred embodiment, the foregoing disclosure should be regarded merely as an example, as numerous additions, substitutions and modifications of the illustrated apparatus may be made without departing from the original spirit and scope of the invention or sacrificing any of its attendant advantages.

What is claimed is:

1. A protective system for a radiation device having a source of penetrative radiation with a shielding surrounding said source and an opening in said shielding defining a radiation exit, comprising a base plate removed from said radiation exit, said base plate including an aperture therein to permit radiation from said source to pass therethrough, shutter guides mounted on and extending the length of said base plate at opposite sides of said aperture, said guides further including retaining means in parallel relationship with said base plate, a shutter, a first set of bearings rotatably mounted on said shutter in rolling engagement with said base plate and said retaining means for positioning said shutter between said base plate and said radiation exit, a second set of bearings rotatably mounted on said shutter having axes perpendicular to said base plate and having peripheral surfaces in rolling engagement with said guides for positioning said shutter between said guides, a first drive means connected to said shutter to maintain said shutter in a position removed from said aperture, and a second drive means connected to said shutter in opposition to said first drive means to maintain said shutter over said radiation aperture.

2. In a radiation device having a source of penetrative radiation with a shielding surrounding said source and an opening in said shielding defining a radiation exit, a base plate removed from said radiation exit including an aperture adjacent to said source to permit passage of radiation, guide bars mounted on and extending the length of said base plate at opposite sides of said aperture, said guide bars further including retaining means in parallel relationship with said base plate, a shutter, a first set of bearings rotatably mounted on said shutter in rolling engagement with said base plate and said retaining means for positioning said shutter between said base plate and said radiation exit, a second set of bearings rotatably mounted on said shutter with axes perpendicular to said base plate and having peripheral surfaces in rolling engagement with said guide bars for positioning said shutter between said guide bars, a first drive means connected to said shutter to maintain said shutter in a position removed from said aperture, second drive means connected to said shutter in opposition to said first drive means to maintain said shutter over said radiation exit, and control means connected to said first drive means for energizing the same.

3. A radiation device having a source of penetrative radiation with a shielding surrounding said source further including an opening in said shielding defining a radiation exit, a shutter comprising a generally rectangular plate having essentially flat upper and lower surfaces, a base plate for supporting said shutter in fixed spatial relation to said source, said base plate including an aperture adjacent said radiation exit, a pair of shutter guides secured to said base plate about opposite sides of said aperture, said guides further including retaining means in parallel relationship to said base plate; a plurality of first bearing means rotatably mounted at each corner of said shutter in rolling engagement with said base plate and said retaining means, said first bearing means having axes mutually parallel to said base plate and perpendicular to said shutter guides for facilitating the rectilinear movement of said shutter between a first position blocking said radiation aperture and a second position removed from said aperture; a plurality of second bearing means rotatably mounted at each of said corners in rolling engagement with said shutter guides, said second bearing means having axes mutually perpendicular to said base plate and normal to the direction of travel of said shutter, means for controlling the operation of said shutter, first drive means connected to said shutter means to maintain said shutter in said second position, and a second drive means connected to said shutter in opposition to said first drive means for urging said shutter to assume said first position and to maintain said shutter in said first position when said first drive means is rendered inoperative.

4. A radiation device substantially as set forth in claim 3 in which said first bearing means comprises at least four cam followers.

5. A radiation device substantially as set forth in claim 3 in which said first drive means comprises a fluid-operated piston and cylinder.

6. A radiation device substantially as set forth in claim 3 in which said second drive means comprises a spring mounted between said shutter and said base plate.

7. In an apparatus for gauging the properties of a material by subjecting said material to the action of a penetrating radiation, a radioactive source emitting said radiation, a housing, means for mounting said source within said housing, an aperture in one side of said housing for permitting a useful beam of radiation from said source to issue forth from said housing, means for positioning a material to be measured in the path of said radiation beam, a shutter comprising an essentially rectangular plate including at least one portion substantially opaque to said radiation beam, first bearing means rotatably mounted at each corner of said shutter for supporting the same during movement between a first position blocking said aperture and a second position removed from said aperture, second bearing means rotatably mounted at each of said corners of said shutter for guiding said shutter during said movement, an angle bracket rigidly secured to said shutter, a first actuator means mounted within said housing and connected to said angle bracket, a power source for energizing said first actuator means, means for controlling the operation of said first actuator means including switch means having a first alternative state for energizing said first actuator means to drive said shutter to said second position, and a second actuator means mounted within said housing and connected between said angle bracket and said housing in opposition to said first actuator means and responsive to said switch means for moving said shutter to said first position when said first actuator means is deenergized.

8. Apparatus substantially as set forth in claim 7 in which said first actuator means comprises a fluid-operated piston and cylinder driving device.

9. Apparatus substantially as set forth in claim 7 in which said second actuator means comprises a spring.

References Cited in the file of this patent

UNITED STATES PATENTS

| | | |
|---|---|---|
| 2,552,858 | Mueller et al. | May 15, 1951 |
| 2,706,789 | Hughes | Apr. 19, 1955 |
| 2,858,450 | Holben | Oct. 28, 1958 |